US008627307B2

(12) United States Patent
Capuozzo et al.

(10) Patent No.: US 8,627,307 B2
(45) Date of Patent: Jan. 7, 2014

(54) EXTENDING THE FUNCTIONALITY OF AN EMBEDDED SYSTEM

(75) Inventors: Giuseppe Capuozzo, Rome (IT); Marco Borghini, Civitavecchia (IT)

(73) Assignee: Accenture Global Services Limited, Dublin (IE)

( * ) Notice: Subject to any disclaimer, the term of this patent is extended or adjusted under 35 U.S.C. 154(b) by 229 days.

(21) Appl. No.: 13/087,834

(22) Filed: Apr. 15, 2011

(65) Prior Publication Data

US 2011/0258618 A1    Oct. 20, 2011

(30) Foreign Application Priority Data

Apr. 16, 2010   (EP) .................................... 10425122

(51) Int. Cl.
*G06F 9/44*   (2006.01)

(52) U.S. Cl.
USPC .......................................... 717/168; 717/174

(58) Field of Classification Search
USPC ................................................ 717/168, 174
See application file for complete search history.

(56) References Cited

U.S. PATENT DOCUMENTS

| | | | | |
|---|---|---|---|---|
| 5,901,225 | A * | 5/1999 | Ireton et al. | 714/6.32 |
| 6,078,967 | A * | 6/2000 | Fulghum | 710/2 |
| 6,615,404 | B1 * | 9/2003 | Garfunkel et al. | 717/173 |
| 6,920,553 | B1 | 7/2005 | Poisner | |
| 7,185,191 | B2 * | 2/2007 | Bosley et al. | 713/2 |
| 7,486,907 | B2 * | 2/2009 | Noguchi et al. | 399/110 |
| 7,577,981 | B2 * | 8/2009 | Clynes et al. | 725/132 |
| 7,734,247 | B2 * | 6/2010 | Gustavsson et al. | 455/3.04 |
| 7,853,720 | B2 * | 12/2010 | Choi et al. | 709/245 |
| 8,392,895 | B2 * | 3/2013 | Tsai et al. | 717/140 |
| 2004/0025165 | A1 * | 2/2004 | Desoli et al. | 719/310 |
| 2004/0103163 | A1 * | 5/2004 | Lin et al. | 709/211 |
| 2005/0240919 | A1 | 10/2005 | Kim et al. | |
| 2008/0182618 | A1 * | 7/2008 | Gustavsson et al. | 455/557 |
| 2008/0209193 | A1 * | 8/2008 | Zhang et al. | 713/1 |
| 2011/0087825 | A1 * | 4/2011 | Cialini et al. | 711/103 |
| 2011/0112968 | A1 * | 5/2011 | Florek et al. | 705/50 |

FOREIGN PATENT DOCUMENTS

| | | |
|---|---|---|
| EP | 1 221 652 | 7/2002 |
| WO | 2008/026139 | 3/2008 |

OTHER PUBLICATIONS

Overhage et al., "Software Architectures, Components, and Applications", 2007.*
European Search Report for Application No. 10425122.8, Oct. 4, 2010.
"U3 Platform 1.0 SDK, Application Deployment Guide, Version 1.0/Revision 4.0)", Internet Citation, Sep. 2005, XP007903637, Retrieved from the Internet: URL: http://onlineconferencingsystems.com/access_tomorrow/ApplicationDeploymentGuide_1.0r4.pdf.

* cited by examiner

*Primary Examiner* — Phillip H Nguyen
(74) *Attorney, Agent, or Firm* — Mannava & Kang, P.C.

(57) ABSTRACT

The present description refers in particular to a computer-implemented method, an embedded system, and a memory. The method relates to extending the functionality of an embedded system, wherein the embedded system includes a firmware in a fixed non-volatile memory. The method comprises attaching an attachable non-volatile memory to the embedded system, wherein an extension is stored in the attachable non-volatile memory; recognizing the extension by the firmware; and executing a service on the embedded system by means of the extension.

18 Claims, 5 Drawing Sheets

EXTENDING THE FUNCTIONALITY OF AN EMBEDDED SYSTEM

PRIORITY

This application claims priority to European patent application serial number 10 425 122.8, filed on Apr. 16, 2010, and entitled "Extending the Functionality of an Embedded System", which is incorporated by reference in its entirety.

The present application relates to a computer-implemented method for extending the functionality of an embedded system, an embedded system with extended functionality, and a memory.

SUMMARY

According to an aspect, a computer-implemented method for extending the functionality of an embedded system is provided. The embedded system may include a firmware in a fixed non-volatile memory. The method may comprise attaching an attachable non-volatile memory to the embedded system. An extension may be stored in the attachable non-volatile memory. The method may also comprise recognizing the extension by the firmware, and executing a service on the embedded system by means of the extension.

In some cases, the attachable non-volatile memory has greater storage capacity than the fixed non-volatile memory.

Furthermore, the fixed non-volatile memory may be built into a chip and the chip may be wired to the embedded system.

Also, the firmware may be stored in the fixed non-volatile memory as a binary image.

Moreover, the attachable non-volatile memory may be a USB storage.

In some cases, the method further comprises loading the extension using a security mechanism; and isolating, by means of the security mechanism, the extension from the firmware. The steps of loading and isolating may be performed before executing the service by means of the extension.

The method may also comprise copying the firmware to a volatile memory of the embedded system by copying the entire contents of the fixed non-volatile memory into the volatile memory of the embedded system.

Also, the volatile memory may be faster than the fixed non-volatile memory, and/or the volatile memory may be faster than the attachable non-volatile memory.

Moreover, the extension may comprise one or more of the following:
 libraries and/or utilities usable by the firmware;
 at least one dynamically loadable module that can be linked to the firmware; and
 a framework enabling execution of the service independent of an architecture of the embedded system.

The method may also comprise attaching a port expander to an interface of the embedded system. Attaching the attachable non-volatile memory to the embedded system may comprise attaching the attachable non-volatile memory to a first port of the port expander, and expanding the embedded system by attaching a device to a second port of the port expander.

In some cases, the embedded system is a network access gateway. Also, the firmware may include an operating system and at least one service.

According to another aspect, an embedded system is provided. The system may comprise a volatile memory, and a fixed non-volatile memory including a firmware. The system may also comprise an interface operable to allow an attachable non-volatile memory to be attached to the embedded system. The attachable non-volatile memory may be operable to store an extension. Also, the firmware may be operable to recognize the extension. Moreover, the embedded system may be adaptable to execute a service by means of the extension. The embedded system may be provided as a device, e.g. an embedded device, or as a computer program product.

According to yet another aspect, an attachable non-volatile memory, attachable to an interface of an embedded system is provided. The memory may comprise an extension including a service, wherein the extension is stored in the attachable non-volatile memory. The extension may be operable to extend a firmware of the embedded system after being recognized by the embedded system. The service may be operable to be executed by the embedded system after the firmware of the embedded system has been extended.

In some embodiments, the attachable non-volatile memory may be attachable to the interface of the embedded system, where the embedded system comprises a volatile memory, and a fixed non-volatile memory including a firmware. The system may also comprise an interface operable to allow the attachable non-volatile memory to be attached to the embedded system. Also, the firmware may be operable to recognize the extension. Moreover, the embedded system may be adaptable to execute a service by means of the extension. The attachable non-volatile memory may also be provided as a device or as a computer program product.

DETAILED DESCRIPTION

In the following text, a detailed description of examples will be given with reference to the drawings. It should be understood that various modifications to the examples may be made. In particular, elements of one example may be combined and used in other examples to form new examples.

The subject matter described in this specification can be implemented as a method or on a device, possibly in the form of one or more computer program products. The subject matter described in the specification can be implemented in a data signal or on a machine readable medium, where the medium is embodied in one or more information carriers, such as a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

Details of one or more implementations are set forth in the exemplary drawings and description below. Other features will be apparent from the description, the drawings, and from the claims.

Figure 1:
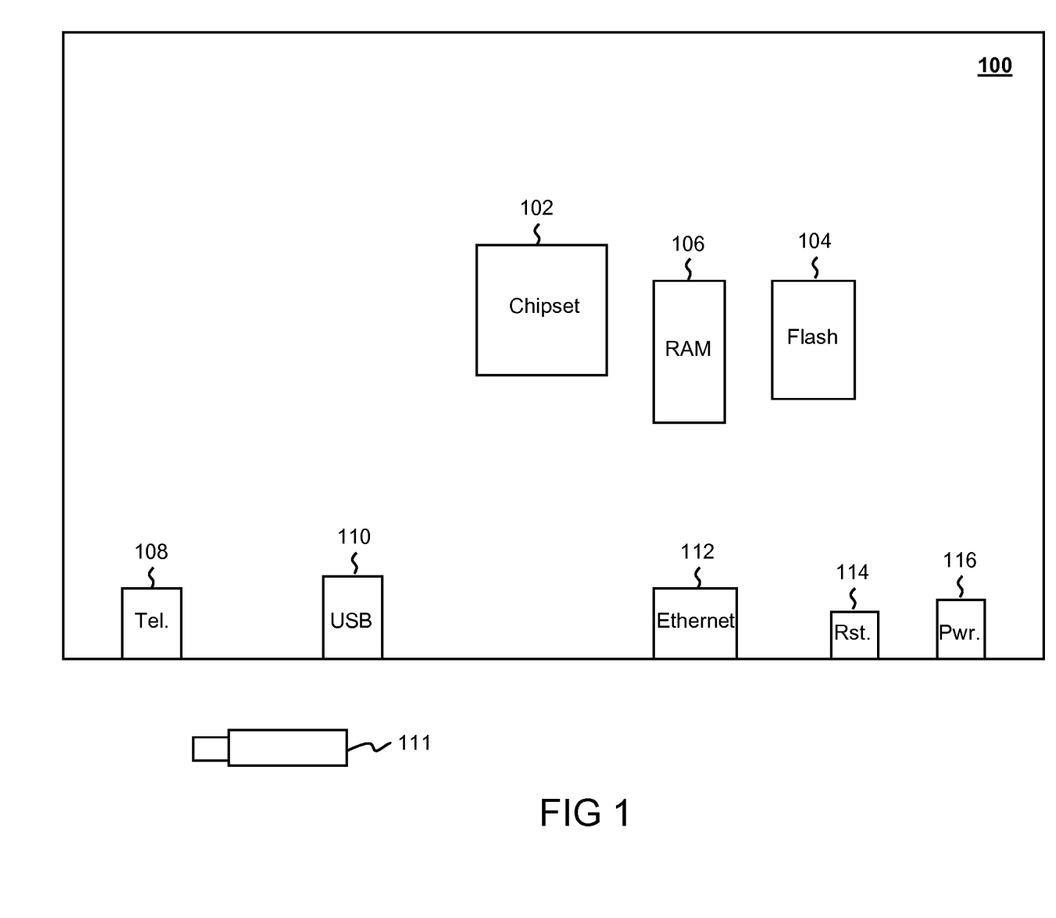
FIG. 1 depicts a block diagram of an embedded system.

FIG. 1 shows components of an embedded system 100 and an attachable non-volatile memory, for example a USB storage 111. The embedded system 100 may be understood as a computer system or a device designed to perform one or a few dedicated functions. The embedded system 100 may be contrasted with a general purpose computer system, e.g. a desktop PC. More specifically, the embedded system 100 may be a network access gateway or residential gateway that provides an Internet connection to a user network (e.g. a home network comprising one or more computers). The embedded system 100 may also be configured to provide access to networks other than the Internet. In a specific example, the embedded system 100 may be an asynchronous digital subscriber line (ADSL) modem. Modems supporting other forms of DSL are also possible. In some cases, the embedded system 100 can perform routing functionality. The embedded system 100 may include a user interface, e.g. a graphical user interface for managing the embedded system 100. Moreover, the embedded system 100 may run services, e.g. an application designed to help a user perform a task or a module enabling another device to be connected to the embedded system 100. Services that can be run on the embedded system 100 may or may not be related to providing access to a network connected to the embedded system 100. The graphical user interface may also be used to manage or control applications on the embedded system 100.

The embedded system 100 may include a chipset 102 with a central processing unit (CPU). In a specific example, the chipset 102 may be a Texas Instruments AR7 combining a MIPS 32 bit CPU, a Digital Signal Processing (DSP)-30 based digital transceiver, and an ADSL analog front end. Other possible chipsets include the Broadcom 6358. The chipset 102 may be a microprocessor or a microcontroller. Further CPUs such as the Advanced RISC Architecture Machine (ARM) or PowerPC are also possible (RISC refers to Reduced Instruction Set Computer).

Some implementations of the embedded system 100 include a non-volatile memory, such as a flash memory 104. Alternatively, the embedded system 100 may include another form of non-volatile memory. The non-volatile memory of the embedded system 100 may be electronically addressable. In some cases, the non-volatile memory of the embedded system 100 may be another form of solid-state memory, such as a Silicon-Oxide-Nitride-Oxide-Silicon (SONOS) memory, or a non-volatile Random Access Memory. Other types of non-volatile memory are also possible.

The flash memory 104 may be fixed to the embedded system 100. In particular, the flash memory 104 may be built into a chip and the chip may be wired to the embedded system 100. The contents of the flash memory 104 may be referred to as a firmware 302 (see FIG. 3).

In some cases, the firmware 302 stored by the flash memory 104 may include an operating system 303 (see FIG. 3) for the embedded system 100. The firmware 302 stored by the flash memory 104 may also include services that can be run on the embedded system 100, and the graphical user interface for managing the embedded system 100. Specifically, the operating system 303 may be Linux, e.g. Linux kernel 2.6 including uClibc libraries. More specifically, the operating system 303 could be implemented using Debian Etch for MIPS with Linux kernel 2.6.1. The operating system 303 may have been stripped of unnecessary components and may include only what is necessary to manage the embedded system 100. The applications may be suitable for performing networking tasks such as routing, firewall maintenance, domain name service (DNS), and dynamic host configuration protocol (DHCP).

Figure 3:
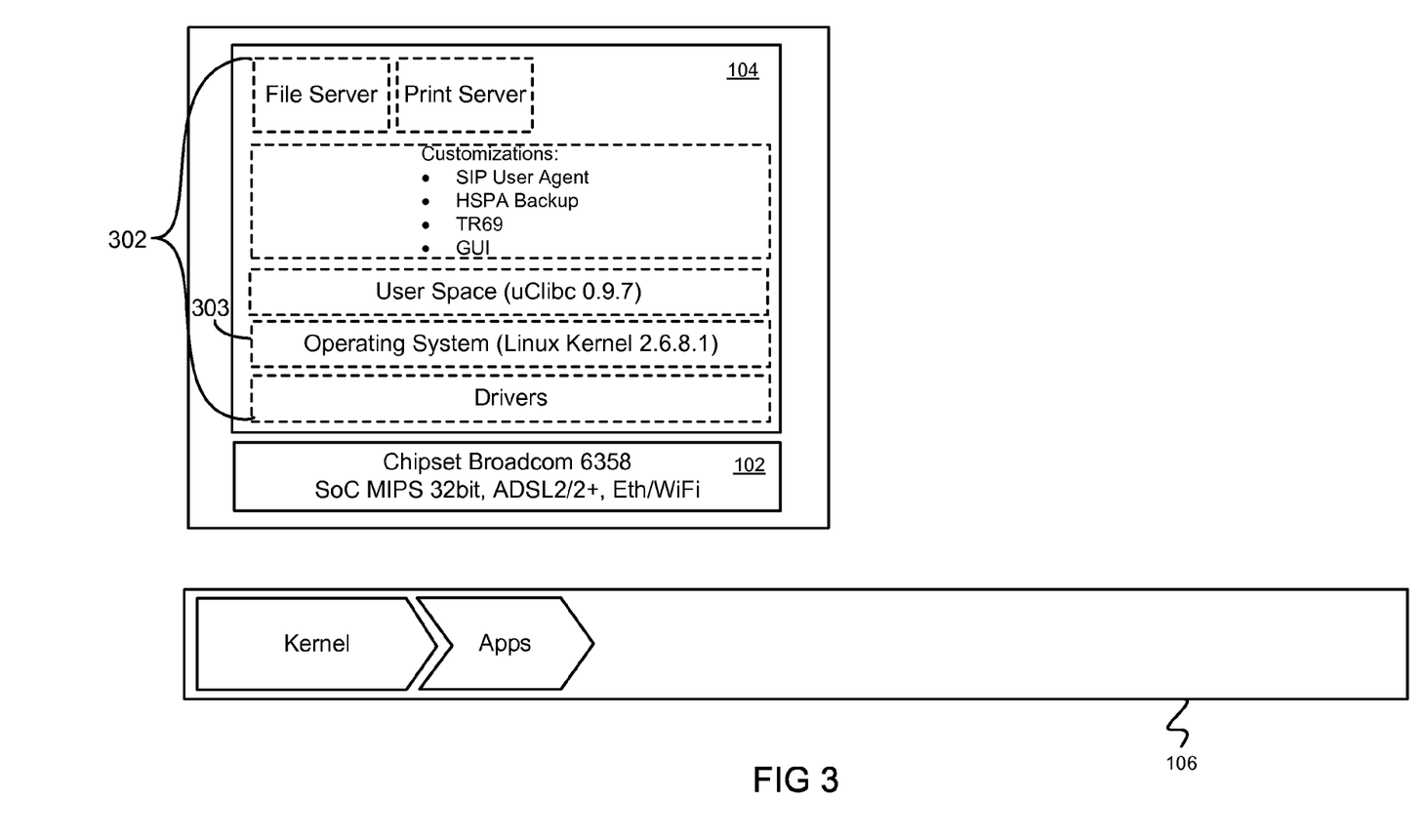
FIG. 3 depicts a functional block diagram of a flash memory, a chipset, and a RAM of the embedded system.

In some embodiments, the operating system 303 allows a supporting service (e.g. drivers) for a further device to be added. For example, the operating system 303 may support linking further functionality to the operating system kernel on demand. In other words, it may be possible to link a dynamically loadable module to the operating system 303. Accordingly, linking the dynamically loadable module to the firmware 302 may be understood as linking the dynamically loadable module to the kernel of the operating system of the embedded system 100. Different kernel modules may be used to support different embedded system architectures and operating system kernels.

In addition to applications, services that may be executed on the embedded system 100 can include kernel modules, device drivers or other software that extends the functionality of the embedded system 100.

The embedded system 100 may include minimal hardware, e.g. hardware required to execute basic networking tasks and no other hardware, in order to lower costs. Moreover, the contents of the flash memory 104 (e.g. operating system and applications) may be stored on the embedded system 100 in a monolithic approach, i.e. as a single closed block.

For example, the contents of the flash memory 104 may be stored as a single closed block, e.g. as a binary image or as a compressed binary image. In other words, the flash memory 104 may contain a binary firmware image or a compressed binary firmware image. This may reduce the amount of flash memory 104 required on the embedded system 100, and thus reduce the cost of producing the embedded system 100. In addition, the use of the binary image on the embedded system 100 may be advantageous for a manufacturer or maintainer of the embedded system 100, e.g. the manufacturer of the embedded system 100 may be able to maintain control of the embedded system 100, such that an extension of the embedded system 100 can only be realized by the manufacturer and a purchaser of the embedded system (e.g. a telecommunications service provider) is forced to ask the manufacturer for support for any new/added features. Moreover, use of the binary image may make it simpler for a user to update the embedded system 100.

The binary image may be understood to contain the complete contents and structure representing a storage medium, e.g. the flash memory 104. A binary image may be stored in a single file.

However, storing the contents of the flash memory 104 as a binary image may have the effect that the only way to upgrade applications stored on the embedded system 100 is to perform a full firmware upgrade, as carried out in prior art methods. In other words, there has been no way to independently upgrade a single application. Instead, the full firmware upgrade has been required even for small changes to one application on the embedded system 100.

It may be difficult or undesirable to perform the full firmware upgrade for an arbitrary update of software on the embedded system 100. The full firmware upgrade may result in the use of more bandwidth, possible errors may have more sever consequences, and the full firmware upgrade may disrupt operations of the embedded system 100. For example, downloading the full firmware in order to make a small change to a single application may require more bandwidth than downloading the part of the application that is changed or the application itself. Furthermore, it is possible that the full firmware upgrade can fail, causing the embedded system 100 to become unusable. Also, the full firmware upgrade often causes an interruption of operation of the embedded system 100, since reboot of the embedded system 100 is normally required. To overcome this problem, the present invention adapts the embedded system 100 to execute a service without upgrading the entire firmware or replacing the embedded system 100 with a more capable device.

The embedded system 100 may further include a volatile memory, such as random access memory (RAM) 106.

In some configurations, the RAM 106 may have a greater storage capacity than the flash memory 104. A reason for this design may be that program execution on the embedded system 100 can be understood as a process where data changes frequently and often does not need to be stored. For example when the embedded system 100 processes Internet Protocol (IP) packets, they may be temporarily stored in the RAM 106 in order to be analyzed and elaborated, but it is possible that the IP packets do not need to be stored when the embedded system 100 is powered down. In other words, it is possible that the IP packets do not need to be stored in the flash memory 104.

It is also possible that the RAM 106 has a lower storage capacity than the flash memory 104. In particular, the capacity of the flash memory 104 may be proportional to the number and the size of programs stored on the embedded system 100. Moreover, the capacity of the RAM 106 may be proportional to the number and the size of programs to be executed concurrently on the embedded system 100. For example, if a number of different applications are stored in the flash memory 104 and it is not necessary for the embedded system 100 to be able to run many programs concurrently, the flash memory 104 may have a greater storage capacity than the RAM 106.

Also, it may be that computer programs can be executed faster using the RAM 106 of the embedded system 100 in comparison to the flash memory 104 of the embedded system 100. Moreover, the embedded system 100 may be designed so that a program must be copied to the RAM 106 before the program can be executed.

In a specific example, the flash memory 104 has a storage capacity of 16 MB, and the RAM 106 has a storage capacity of 32 MB.

In some cases, the embedded system 100 does not include mechanically addressed non-volatile memory, such as a hard disk.

Furthermore, the embedded system 100 may include a means of access connectable to an external network, such as a telephone port 108. The means of access could also be a fiber port or an Ethernet port depending on a type of the external network. The external network may be the Internet or another network.

Also, the embedded system 100 may include an interface, such as a universal serial bus (USB) port 110. The interface may be a peripheral interface. The interface may also be another type of serial interface, such as FireWire, or a type of parallel interface operable to allow an attachable non-volatile memory to be connected to the embedded system 100. In cases where the interface is the USB port 110, the attachable non-volatile memory may be implemented as USB storage 111. In a specific example, the USB storage 111 may be a USB flash drive (as depicted in FIG. 1) or an external hard drive connectable via a USB cable (not depicted). Accordingly, attaching the attachable non-volatile memory to the embedded system 100 may be implemented by attaching the USB storage 111 to the USB port 110. In this context, attaching may be understood as connecting or plugging in, i.e. plugging the USB storage 111 into the USB port 110.

In some embodiments, the USB storage 111 has a storage capacity of at least 128 Megabytes (MB). Thus, the storage capacity of the attachable non-volatile memory (e.g. the USB storage 111) may be greater than the storage capacity of the fixed non-volatile memory (e.g. the flash memory 104). Furthermore, the RAM 106 may be faster than the flash memory 104 and/or the USB storage 111.

The embedded system 100 may also include a means of access connectable to a local network, such as an Ethernet port 112. The embedded system 100 may also support wireless access, e.g. by means of wireless fidelity (WiFi). The local network may be a home network or an internal network or another network.

In addition, the embedded system 100 may include a reset button 114 that can be used to return the embedded system 100 to a standard or default configuration. The embedded system 100 may further include a power connector 116 that can be used to connect the embedded system 100 to a power source.

Figure 2:
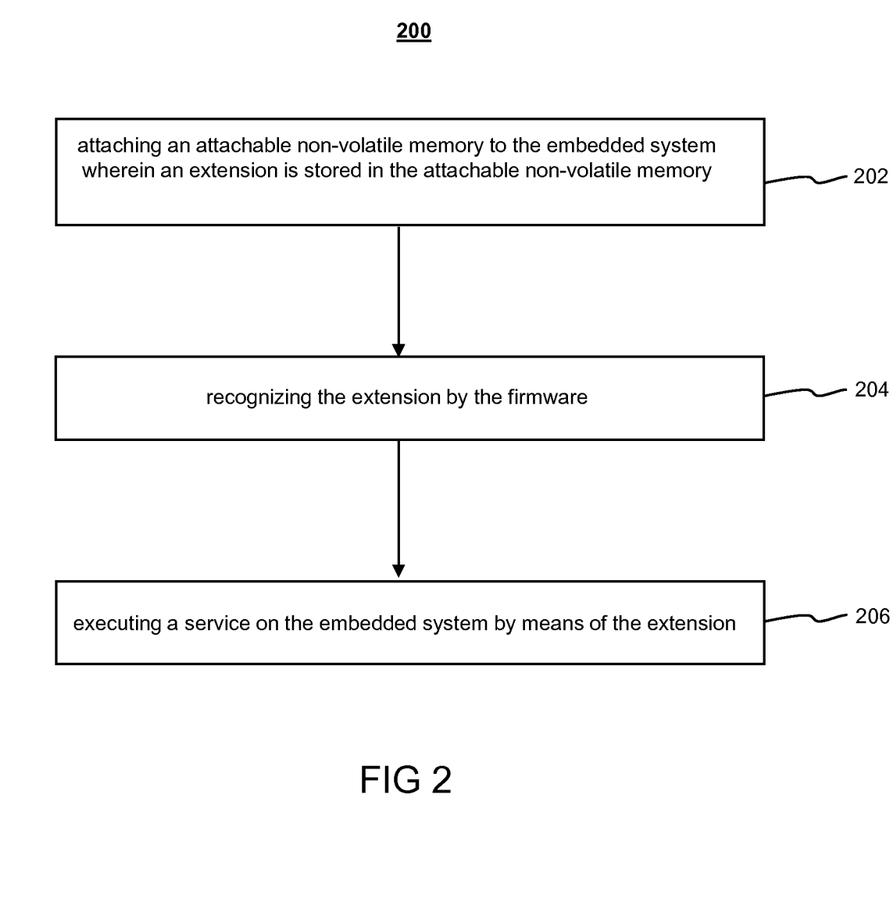
FIG. 2 shows a method for extending the functionality of the embedded system.

FIG. 2 shows an exemplary method 200 for extending the functionality of the embedded system 100. The embedded system may include a fixed non-volatile memory, e.g. the flash memory 104. The flash memory 104 may comprise the firmware 302. The firmware 302 may include the operating system 303 for the embedded system 100 and one or more services.

The method 200 may comprise, at step 202, attaching an attachable non-volatile memory, e.g. the USB storage 111, to the embedded system 100. An extension may be stored in the USB storage 111.

The extension may include a full operating system environment corresponding to the operating system 303 of the embedded system 100. In particular, the operating system 303 of the embedded system 100 may include software that is not commonly found on a desktop PC needed to run certain applications. Accordingly, the extension may include libraries usable by the firmware 302, e.g. usable by the operating system 303. The extension may also include operating system utilities and modules.

For example, if the firmware 302 includes a version of the Linux operating system, the libraries of the extension may include user space libraries, such as GNU C library (glibc) 306 (see FIG. 3), and libraries required to run a Java virtual machine (Java is a trademark of Oracle Corporation). In this context, a library may include one or more subroutines, classes or data usable by a program. The library may be independently executable.

The modules of the extension may include drivers for controlling and managing devices operating according to the X10 standard for electronic devices. The modules may also include a Session Initiation Protocol (SIP) back to back user agent and a Real-Time Transfer Protocol (RTP) proxy to manage Voice over IP services. In addition, the utilities may include a Universal Plug-and-Play (UPnP) audiovisual media server, which can be used to share media content. The modules may also include software to enable control of lights and appliances using a mobile communication device, e.g. an iPhone. The modules may be referred to as kernel modules and may be dynamically loadable.

Exemplary applications of the extension that may be run on the embedded system 100 include an image searching application. Accordingly, a user may upload a plurality of images to the embedded system 100. For example, the user may come back from a holiday with a number of images stored in a digital camera. The user may connect a digital camera to the embedded system 100 and all the images may be automatically uploaded from the digital camera to the embedded system 100. The images may be stored on USB storage 111. The user may then interact with the image searching application in order to search for images.

Moreover, the extension may include a framework that enables execution of an application, such as the image searching application, independent of an architecture of the embedded system 100. In some implementations, the framework may be based on OSGi and the Java programming language, and may provide an application execution environment that is tailored to the architecture of the embedded system 100. More specifically, the framework may be defined according to the OSGi Specifications, Release 4, version 4.2, available from http://www.osgi.org. Accordingly, the framework may enable dynamic management of applications and dependencies. The framework may also provide a set of Application Programming Interfaces (APIs) that support devices with different capabilities and resources and enable applications to interact with those devices without needing the application developer to be aware of the details of the architecture of each device. Furthermore, the framework may provide a dynamic loader to install new applications. The framework may also be referred to as a middleware.

The flash memory 104 may be fixed by being wired to a circuit board of the embedded system 100. The operating system 303 may include support for the USB storage 111 and support for dynamically loadable modules. The operating system 303 may also support a port expander that can be attached to the USB port 110. The port expander may be supported if the USB port 110 is the only USB port on the embedded system 100, and it is desirable to attach additional devices to the embedded system 100. In case the RAM 106 does not provide sufficient storage capacity to execute a particular application, the operating system 303 may support virtual memory.

In the specific example where the firmware 302 includes the Linux operating system, the firmware 302 may include support for configuring the Linux kernel, as well as Linux kernel headers and cross compilation tools.

In some cases, the method also comprises copying the firmware 302 to the RAM 106 by copying the entire contents of the flash memory 104 into the RAM 106. The operation of copying the entire contents of the flash memory 104 into the RAM 106 may be referred to as a bulk read. Copying the entire contents of the flash memory 104 into the RAM 106 by means of the bulk read may enable simpler and more efficient operation of the embedded system 100.

The method 200 may also comprise, at step 204, recognizing the extension by the firmware 302, e.g. by means of a digital certificate. In some implementations, the digital certificate may be stored on the USB storage 111 and may be verified by the operating system 303. Other means may also be used to recognize the extension including code signing, a hardware lock (the USB storage 111 must include particular hardware features to be recognized), or encryption.

Recognizing the extension by the firmware 302 may have the technical effect of adapting the embedded system 100 to execute the service, e.g. the image search application described above. Execution of the service without the extension might not have been possible without upgrading the entire firmware 302 or replacing the embedded system 100 with a more capable device.

The user interface of the embedded system 100 may allow the extension to be configured. In this case, the framework may be loaded automatically. Alternatively, the extension may be recognized and configured automatically; accordingly, the extension may run in the background and load applications or recognize new devices automatically.

Once the extension is recognized and configured, the framework may be configured to load services, including the image search application, manually or automatically. The extension may be configured to provide virtual memory for the embedded system 100 via the USB storage 111, or to extend existing virtual memory of the embedded system 100 via the USB storage 111.

In some embodiments, the extension may be loaded using a security mechanism. Loading of the extension may occur after recognizing the extension and before configuring the extension. The security mechanism may be a sandbox. In other words, the security mechanism may be software that is used to separate running programs. Put yet another way, the extension is loaded in a virtual environment, separate from the firmware 302 of the embedded system 100. Accordingly, the security mechanism can be used to isolate the extension from the firmware 302. More specifically, when both the extension and the firmware 302 are loaded into the RAM 106 and are both running, the security mechanism can be used to isolate the firmware 302 from the extension.

In a particular example, the security mechanism may be a chroot environment 304 (see FIG. 3). The chroot environment 304 may be implemented by changing the apparent root directory for the extension and any process executed by the extension. In other words, the extension, and child processes of the extension, are unable to access files of the firmware 302. More specifically, loading the extension using a security mechanism may be implemented by loading files associated with the extension into the sandbox (e.g. the chroot environment 304), thereby ensuring that applications, libraries and utilities executed within the framework cannot access the firmware 302. The security mechanism may also be implemented via other means of program isolation.

Advantageously, the security mechanism may be used to guarantee that the embedded system 100 provides at least the same level of functionality provided before the extension was loaded. The image search application (or other application) executed using the extension may be executed in a protected environment that allows low level system protection.

The method 200 may also comprise at step 206 executing the service after the extension is loaded. Executing a service on the embedded system 100 by means of the extension may be understood to include executing libraries, modules, or applications usable by the firmware 302. The service may also include additional operating system utilities, such as shell commands.

Executing the service by the extension may enable an additional device to be attached to the embedded system 100. For example, the additional device may be attached to another USB port (not depicted) on the embedded system 100. In another example, attaching the additional device may comprise attaching a port expander, such as a USB hub, to the USB port 110. In particular, the port expander may be used if the USB port 110 is the only USB port on the embedded system 100. According to the example, when the USB storage 111 is attached in step 202, the USB storage 111 is attached to a first port of the port expander and the port expander is attached to the USB port 110. The additional device may then be attached to a second port of the port expander.

Other applications may also be added to the embedded system 100 by means of the extension including an Internet Protocol-Private Branch eXchange (IP-PBX) system, a Digital Living Network Alliance (DLNA) media server, a home automation application for controlling household appliances via a home automation gateway, a video surveillance system, and a smart energy monitoring system.

Additional applications, other types of non-volatile memory, or other interfaces are also possible, as described with respect to FIG. 1.

In addition, the extension may enable the operating system 303 to support other functionality. For example, the extension may include modules that can be dynamically loaded by the operating system kernel in order to support additional file systems, e.g. the Linux ext2 file system. The extension may also include modules that enable the operating system 303 to support additional attached devices, such as the home automation gateway, a ZigBee interface, or a digital camera control module 308 (see FIG. 3). Smart energy meters could also be connected to the embedded system 100 using the extension.

The method 200 may enable the functionality of the embedded system 100 to be extended without replacing the embedded system. In addition, the method 200 may make it possible to install a new service update an individual application without a full firmware upgrade. Moreover, the framework included in the extension may enable the development of highly portable services for a variety of device architectures.

FIG. 3 depicts a functional block diagram of the flash memory 104, the chipset 102, and the RAM 106 of the embedded system 100.

The example of FIG. 3 represents the state of the embedded system 100 before attaching the USB storage 111.

In the exemplary depiction of FIG. 3, the firmware stored in the flash memory 104 includes a print server and a file server. The firmware stored in the flash memory 104 also includes customizations to the embedded system 100, used for example by a telecommunications service provider. The customizations may include a session initiation protocol (SIP) user agent, a high speed packet access (HSPA) backup utility to manage mobile telephony protocols, a technical report 069 (TR-069) utility for remote management of the embedded system 100, and a graphical user interface (GUI). According to the example, the firmware stored in the flash memory 104 also includes user space libraries (e.g. uClibc), the operating system (e.g. Linux), and device drivers. In this particular case, the flash memory 104 has a 16 MB storage capacity.

Continuing with the example in FIG. 3, the chipset 102 is a Broadcom chipset 6358, with a System on a Chip (SoC) 32-bit MIPS processor, supporting asynchronous digital subscriber line (ADSL) 2/2+, as well as Ethernet and wireless fidelity (WiFi).

The RAM 106 of FIG. 3 includes a kernel of the operating system and one or more applications (Apps). The applications in the RAM 106 correspond to the customizations in the flash memory 104. In this particular case, the RAM has a 64 MB storage capacity.

Figure 4:
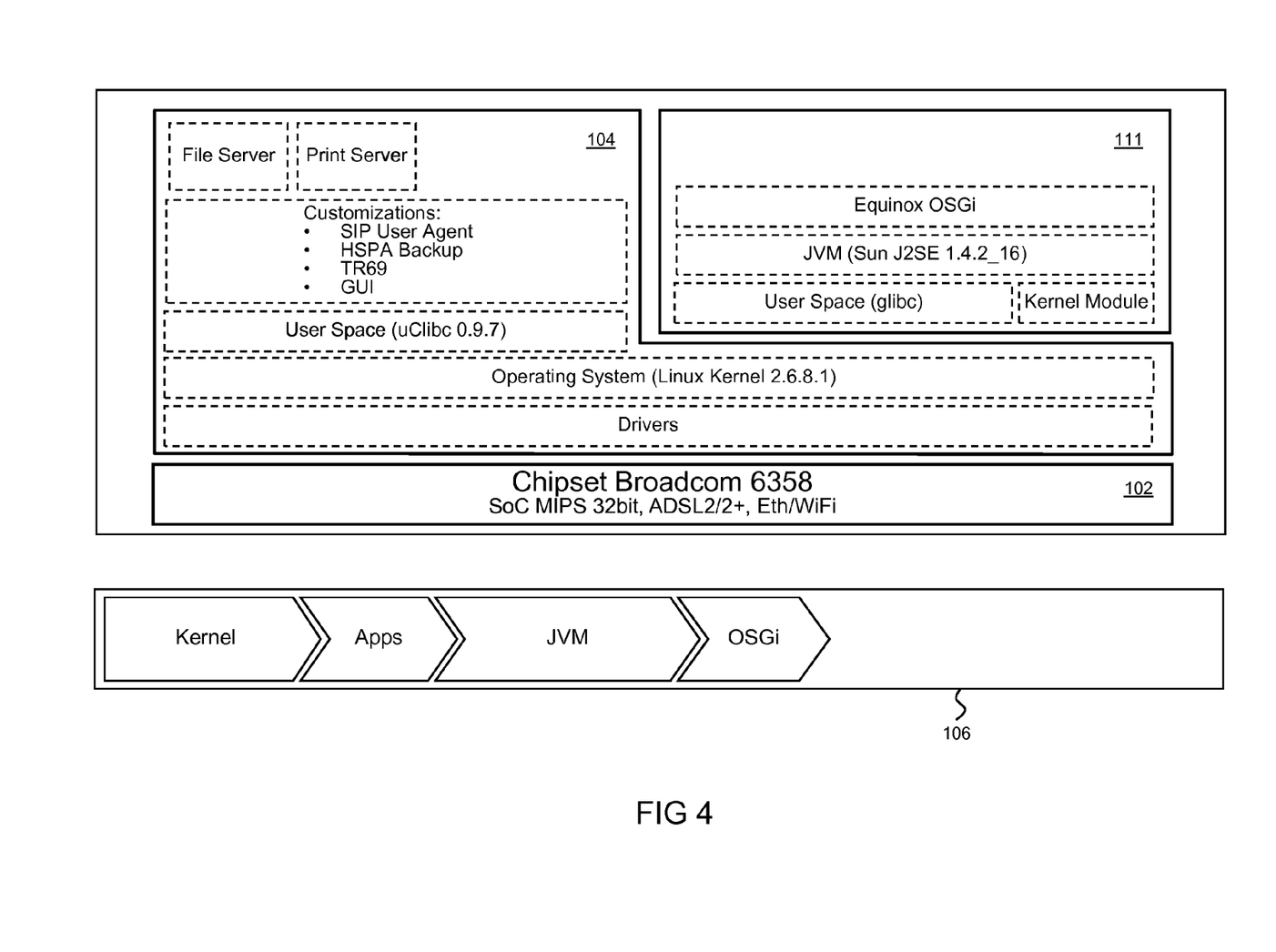
FIG. 4 depicts a functional block diagram of the flash memory, the chipset, the RAM, and a USB storage after an extension stored in the USB storage has been recognized by a firmware of the embedded system.

FIG. 4 depicts a functional block diagram of the flash memory 104, the USB storage 111, the chipset 102 and the RAM 106 after the extension stored on the USB storage 111 has been recognized by the firmware. Thus, FIG. 4 differs from FIG. 3 in that the USB storage 111 has been attached to the embedded system 100 and the extension stored in the USB storage 111 has been recognized by the firmware.

According to the example depicted in FIG. 4, the extension stored on the USB storage 111 includes a framework (in this case an Equinox OSGi framework), a Java Virtual Machine (JVM), glibc user space libraries, and at least one Linux kernel module.

In addition to the kernel of the operating system and the applications depicted in FIG. 3, the RAM 106 of FIG. 4 includes the JVM and the Equinox OSGi framework from the USB storage 111. The security mechanism (not depicted) may be used to isolate the JVM and the OSGi framework from the kernel of the operating system and the applications.

Figure 5:
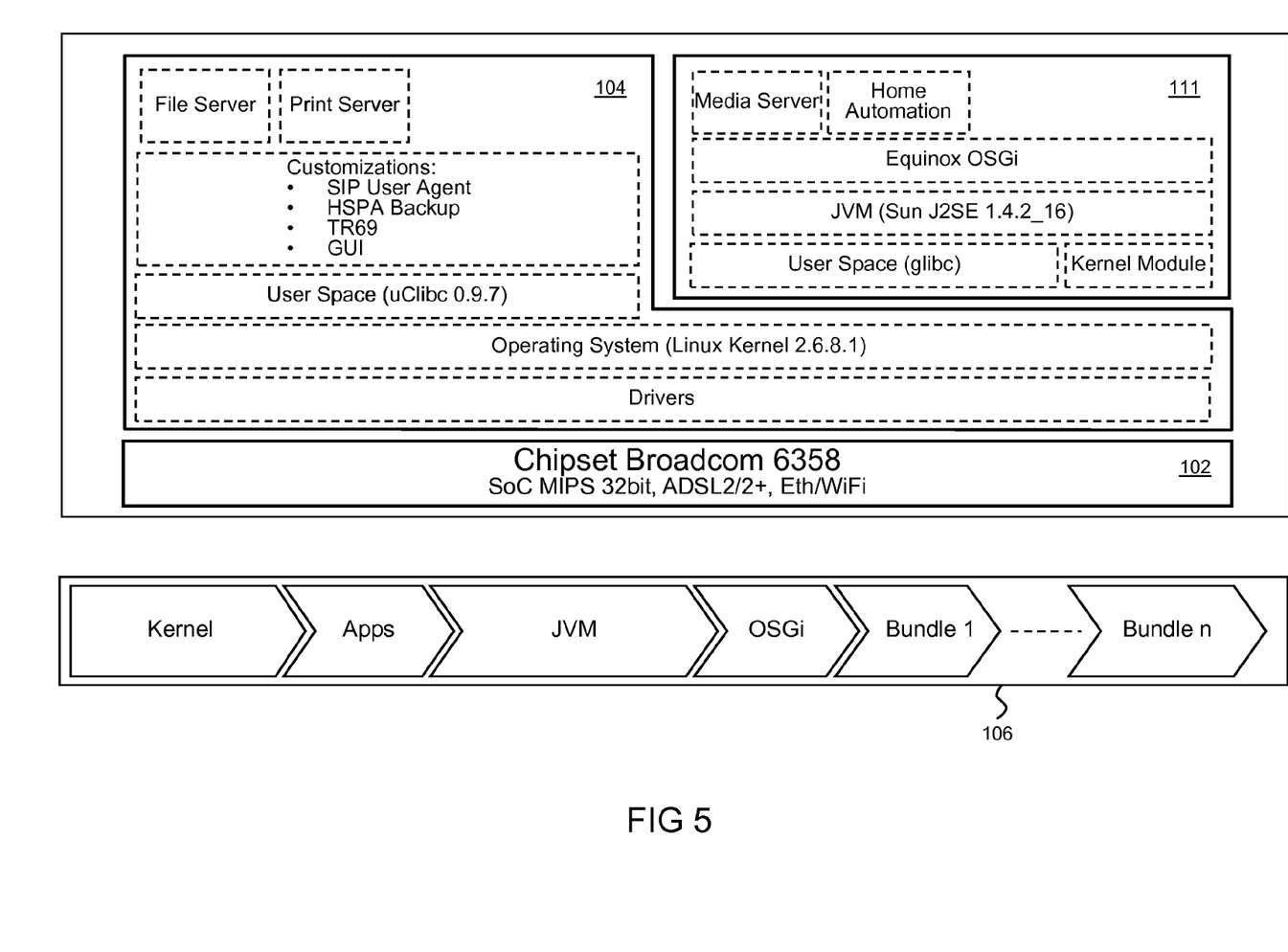
FIG. 5 depicts a functional block diagram of the flash memory, the chipset, the RAM, and the USB storage, where the extension includes two applications.

FIG. 5 depicts a functional block diagram of the flash memory 104, the USB storage 111, the chipset 102 and the RAM 106, where the USB storage 111 includes two services, i.e. a media server application and a home automation application.

The RAM 106 of FIG. 5 includes bundle 1 to bundle n. Each bundle from 1 to n may be understood to represent a dynamically loadable collection of one or more classes, Java Archives (JAR)s, and configuration files, with explicitly declared external dependencies (if any). The bundles may be implemented according to the OSGi standard. In this particular example, n is 2 and the bundles 1 to n correspond to the media server application and the home automation application.

In some embodiments, the security mechanism (not depicted) may be used to isolate the JVM, the OSGi framework, and the media server application bundle from the kernel of the operating system and the applications.

Thus, FIG. 5 differs from FIG. 4 in that the USB storage 111 includes 2 applications and these applications have loaded into the RAM 106 as bundles.

What is claimed is:

1. A computer-implemented method for extending the functionality of an embedded system wherein the embedded system includes a firmware in a fixed non-volatile memory the method comprising:
   attaching an attachable non-volatile memory to the embedded system wherein an extension is stored in the attachable non-volatile memory;
   recognizing the extension by the firmware;
   loading the firmware to a volatile memory of the embedded system from the fixed non-volatile memory;
   loading the recognized extension from the attachable non-volatile memory to the volatile memory; and
   executing a service on the embedded system by the extension, wherein the executing includes running the firmware and the extension simultaneously from the volatile memory.

2. The method of claim 1, wherein the firmware is stored in the fixed non-volatile memory as a binary image.

3. The method of claim 1, wherein the fixed non-volatile memory is built into a chip and wherein the chip is wired to the embedded system.

4. The method of claim 1, wherein the attachable non-volatile memory is a USB storage.

5. The method of claim 1, wherein the attachable non-volatile memory has greater storage capacity than the fixed non-volatile memory.

6. The method of claim 1, further comprising:
   loading the extension using a security mechanism; and
   isolating the extension from the firmware by the security mechanism.

7. The method of claim 1, wherein the copying of the firmware to the volatile memory of the embedded system comprises copying the entire contents of the fixed non-volatile memory into the volatile memory of the embedded system.

8. The method of claim 7, wherein the volatile memory is faster than the fixed non-volatile memory, and/or wherein the volatile memory is faster than the attachable non-volatile memory.

9. The method of claim 1, wherein the extension comprises one or more of the following:
   a library usable by the firmware;

at least one dynamically loadable module that can be linked to the firmware; and a framework enabling execution of the service independent of an architecture of the embedded system.

10. The method of claim 1, further comprising:

attaching a port expander to an interface of the embedded system, wherein attaching the attachable non-volatile memory to the embedded system comprises attaching the attachable non-volatile memory to a first port of the port expander;

expanding the embedded system by attaching a device to a second port of the port expander; and operating the device by means of the extension.

11. The method of claim 1, wherein the embedded system is a network access gateway.

12. The method of claim 1, wherein the firmware includes an operating system and at least one application.

13. The method of claim 1, wherein the loading of the recognized extension comprises:

loading the recognized extension in a virtual environment in the volatile memory, wherein the recognized extension loaded in the virtual environment is isolated from the firmware, and wherein the virtual environment separates the extension from the firmware when simultaneously executed from the volatile memory.

14. An embedded system comprising:

a volatile memory a fixed non-volatile memory including a firmware;

an interface operable to allow an attachable non-volatile memory to be attached to the embedded system wherein the attachable non-volatile memory is operable to store an extension;

wherein the firmware is operable to:

recognize the extension, copy the firmware to the volatile memory, load the recognized extension from the attachable non-volatile memory to the volatile memory; and wherein the embedded system is adaptable to execute a service by the extension, and the executing includes running the firmware and the extension simultaneously from the volatile memory.

15. The system of claim 14, wherein the firmware is stored in the fixed non-volatile memory as a binary image.

16. The embedded system of claim 14, wherein the recognized extension is operable to be loaded into a virtual environment in the volatile memory, and the recognized extension loaded in the virtual environment is isolated from the firmware, and the virtual environment separates the extension from the firmware when simultaneously executed from the volatile memory.

17. An attachable non-volatile memory attachable to an interface of an embedded system, the memory comprising:

an extension including a service, wherein the extension is stored in the attachable non-volatile memory;

wherein the extension is operable to extend a firmware of the embedded system after being recognized by the embedded system, and the firmware is operable to load the firmware from the attachable non-volatile memory to a volatile memory of the embedded system, load the recognized extension to the volatile memory from the attachable non-volatile memory; and wherein the service is operable to be executed by the embedded system after the firmware of the embedded system has been extended, and the executing includes running the firmware and the extension simultaneously from the volatile memory.

18. The attachable non-volatile memory of claim 17, wherein the recognized extension is operable to be loaded into a virtual environment in the volatile memory, and the recognized extension loaded in the virtual environment is isolated from the firmware, and the virtual environment separates the extension from the firmware when simultaneously executed from the volatile memory.

* * * * *